United States Patent [19]
Kurth

[11] Patent Number: 6,142,656
[45] Date of Patent: Nov. 7, 2000

[54] MULTI-FUNCTIONAL SIDE REAR VIEW MIRROR FOR A VEHICLE

[76] Inventor: John F. Kurth, One Stormy Circle Dr., Greenwich, Conn. 06830

[21] Appl. No.: 09/276,863

[22] Filed: Mar. 26, 1999

[51] Int. Cl.[7] .................................................. B60Q 1/26
[52] U.S. Cl. ........................ 362/494; 362/540; 340/475; 340/479
[58] Field of Search .................................. 362/494, 540, 362/541; 340/475, 479, 468

[56] References Cited

U.S. PATENT DOCUMENTS

| | | | |
|---|---|---|---|
| 5,436,741 | 7/1995 | Crandall | 359/15 |
| 5,587,699 | 12/1996 | Faloon et al. | 340/475 |

*Primary Examiner*—Sandra O'Shea
*Assistant Examiner*—Ronald E. DelGizzi

[57] ABSTRACT

A multi-functional side rear view mirror for a vehicle for preventing blind spots for viewers. The multi-functional side rear view mirror includes a housing for mounting to the vehicle, a pair of mirrors disposed in the housing for viewing behind the vehicle, a pair of side marker lights disposed on the housing for continuously illuminating while the external light system of the vehicle is activated for preventing blind spots for the viewers, a turn signal light disposed on the housing for flashing while the turn signal system of the vehicle is activated for preventing blind spots for the viewers, and a brake light disposed on the housing for continuously illuminating while the brake light system of the vehicle is activated for preventing blind spots for the viewers.

15 Claims, 2 Drawing Sheets

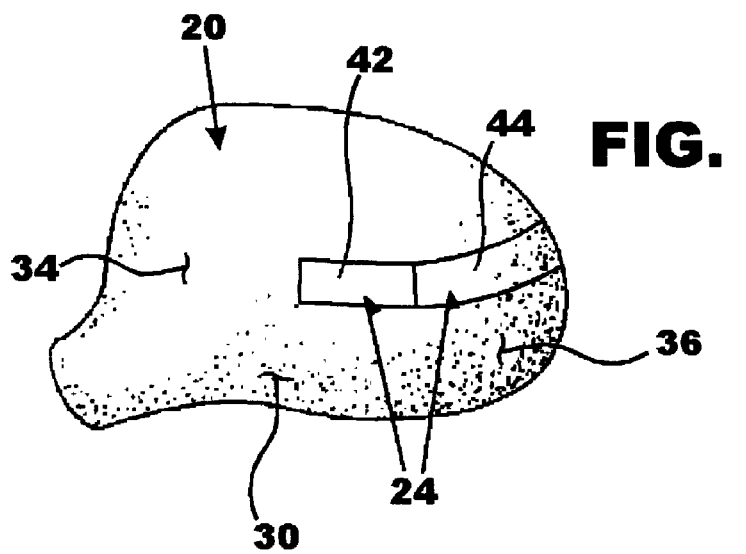
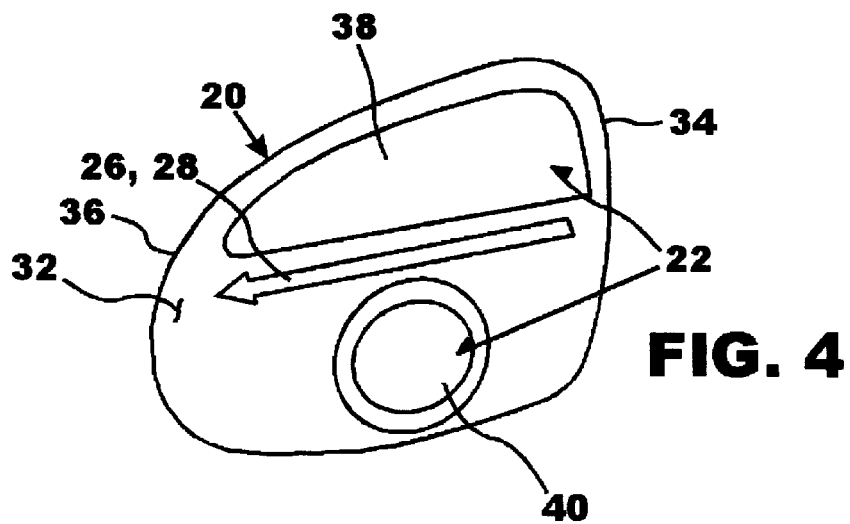
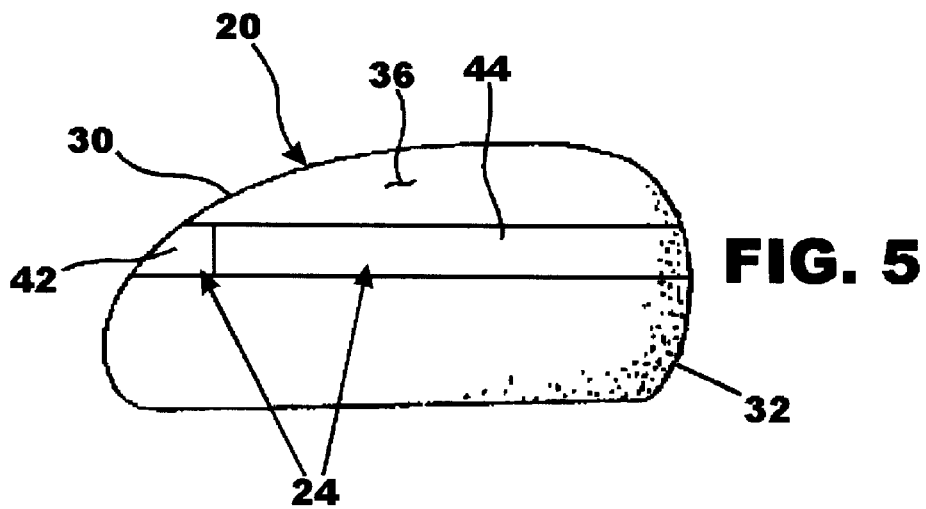

MULTI-FUNCTIONAL SIDE REAR VIEW MIRROR FOR A VEHICLE

BACKGROUND OF THE INVENTION

1. Field of the Invention

The present invention relates to a side rear view mirror for a vehicle. More particularly, the present invention relates to a multi-functional side rear view mirror for a vehicle.

2. Description of the Prior Art

In heavy traffic, a passing driver may not see the rear turn signal lamp, the tail light, or the rear brake light when an initial overlap occurs.

Additional safety for vehicles passing in multiple traffic, lanes to indicate when passing of another vehicle is anticipated or intended or that change over to an inner or outer lane of multiple lane road is required.

Numerous innovations for side rear view mirrors for a vehicle have been provided in the prior art that will be described. Even though these innovations may be suitable for the specific individual purposes to which they address, however, they differ from the present invention.

FOR EXAMPLE, U.S. Pat. No. 4,475,100 to Duh teaches a side rear view mirror of a vehicle with an indicator light. A margin is provided with an indicator light to aid in driving safely.

ANOTHER EXAMPLE, U.S. Pat. No. 4,583,155 to Hart teaches a brake light incorporated in a side view mirror housing. The brake light may be fixedly attached to the housing and viewable from the rear of the vehicle. Brake lights which move from a stored position within said mirror housing to an in use position exterior of said housing are also disclosed. The further the brake light portion is from the vehicle the more viewable it will be from the rear of the vehicle.

STILL ANOTHER EXAMPLE, U.S. Pat. No. 4,882,565 to Gallmeyer teaches a rear view mirror assembly for vehicles which displays information useful to the driver/viewer when viewing the mirror assembly. Indicia are formed by narrow deletion lines, preferably using computer controlled laser marking apparatus, in a reflective coating on a mirror element of the assembly. A light source, which may be a light emitting diode, an incandescent bulb or another type source, is positioned behind the mirror element to illuminate the indicia for distinct, clear, precise visibility by the driver/viewer. The lines of the deletion area are sufficiently narrow as to be generally unnoticeable to the unaided viewer's eyes when a rear vision image is reflected by the reflecting surface and the light source is unlit thereby preventing interference with normal driving use of the mirror assembly. The light source may be used to simultaneously illuminate portions of the vehicle as well as the deletion area indicia.

YET ANOTHER EXAMPLE, U.S. Pat. No. 4,916,430 to Vu et al. teaches a backup side view mirror light for a motor vehicle that consists of a housing that has a rearwardly facing opening mounted to underside of a side view mirror which is adapted for attachment: to a door of the motor vehicle, with an auxiliary lamp mounted within the housing. A reflector mirror and a transparent lens each cover a portion of the opening. Reflected light beams from the auxiliary lamp cause the reflector mirror to serve as an auxiliary backup warning light while direct light beams from the auxiliary lamp coming through the transparent lens are directed rearwardly to illuminate rear fender of the motor vehicle to help driver to see at night when parking.

STILL YET ANOTHER EXAMPLE, U.S. Pat. No. 5,109,214 to Heidman teaches rear view mirrors attached to the front doors that have mounted thereon flashing lane changing signal lamps which are readily visible to the passing driver, however, do not interfere in any way to the vision of the driver or passengers. For further safety in alerting others, these lamps also will flash in unison with brake lamps when vehicle is backing. In addition, third and fourth self contained thermostatic lamps also can be incorporated as a separate auxiliary hazard using minute drain on battery for long term signaling.

FINALLY, YET STILL ANOTHER EXAMPLE, U.S. Pat. No. 5,669,705 to Pastrick et al. teaches a floodlight that is adapted to projecting a pattern of light from the housing of a vehicle exterior mirror on an area adjacent a portion of the vehicle in order to create a lighted security zone in that area. The pattern extends laterally onto the vehicle and downwardly and rearwardly of the mirror housing. In this manner, the lighted security zone extends from the vehicle door to the rear of the vehicle. An actuator for the floodlight includes a base unit in the vehicle and a remote transmitter wherein the base unit is responsive to a signal from the remote transmitter in order to actuate the floodlight. The actuator may further include a lockout device in order to prevent actuation of the floodlight during operation of the vehicle. A signal light is additionally included in the exterior mirror housing in order to project a second pattern of light from the mirror housing extending laterally away from the vehicle and rearwardly of the vehicle. In this manner, the second pattern cannot be directly observed by the driver of the vehicle but may be observed by the driver of another vehicle passing the equipped vehicle. The signal light operates in unison with a turn signal, brake signal, or both, of the equipped vehicle.

It is apparent that numerous innovations for side rear view mirrors for a vehicle have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a multi-functional side rear view mirror for a vehicle that avoids the disadvantages of the prior art.

ANOTHER OBJECT of the present invention is to provide a multi-functional side rear view mirror for a vehicle that is simple and inexpensive to manufacture.

STILL ANOTHER OBJECT of the present invention is to provide a multi-functional side rear view mirror for a vehicle that is simple to use.

BRIEFLY STATED, YET ANOTHER OBJECT of the present invention is to provide a multi-functional side rear view mirror for a vehicle for preventing blind spots for viewers. The multi-functional side rear view mirror includes a housing for mounting to the vehicle, a pair of mirrors disposed in the housing for viewing behind the vehicle, a pair of side marker lights disposed on the housing for continuously illuminating while the external light system of the vehicle is activated for preventing blind spots for the viewers, a turn signal light disposed on the housing for flashing while the turn signal system of the vehicle is activated for preventing blind spots for the viewers, and a brake light disposed on the housing for continuously illuminating while the brake light system of the vehicle is activated for preventing blind spots for the viewers.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 3 is a diagrammatic front elevational view taken generally in the direction of ARROW 3 in FIG. 2;

FIG. 4 is a diagrammatic rear elevational view taken generally in the direction of ARROW 4 in FIG. 2; and FIG. 5 is a diagrammatic side elevational view taken generally in the direction of ARROW 5 in FIG. 2.

Figure 1:
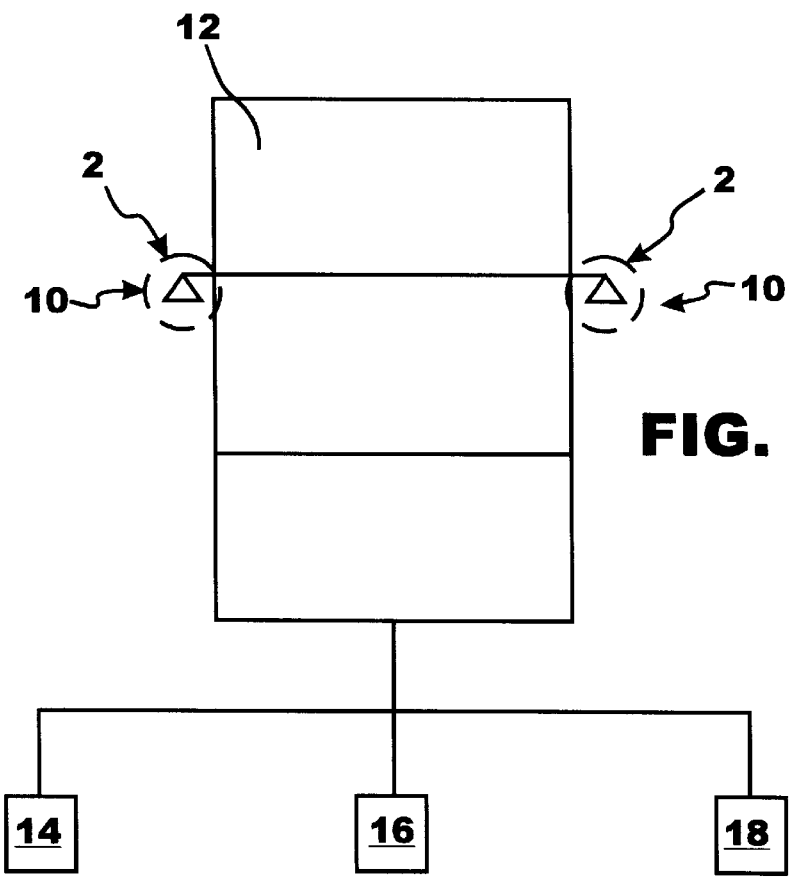
FIG. 1 is diagrammatic perspective view of the present invention mounted on a vehicle.

LIST OF REFERENCE NUMERALS UTILIZED IN THE DRAWING 10 multi-functional side rear view mirror for a vehicle of the present invention
12 vehicle
14 external lighting system of vehicle 12
16 turn signal system of vehicle 12
18 brake light system of vehicle 12
20 housing for mounting to vehicle 12
22 pair of mirrors for viewing behind vehicle 12
24 pair of side marker lights for continuously illuminating while external light system 14 of vehicle 12 is activated for preventing blind spots for viewers
26 turn signal light for flashing while turn signal system 16 of vehicle 12 is activated for preventing blind spots for viewers
28 brake light for continuously illuminating while brake light system 18 of vehicle 12 is activated for preventing blind spots for viewers
30 front face of housing 20 for facing forwardly
32 rear face of housing 20 for facing rearwardly
34 inner side face of housing 20 for facing vehicle 12
36 outer side face of housing 20
38 flat mirror of pair of mirrors 22
40 convex mirror of pair of mirrors 22
42 first side marker light of pair of side marker lights 24
44 second side marker light of pair of side marker lights 24

DETAILED DESCRIPTION OF THE PREFERRED EMBODIMENT

Referring now to the figures, in which like numerals indicate like parts, and particularly to FIG. 1, which is diagrammatic perspective view of the present invention mounted on a vehicle, the multi-functional side rear view mirror for a vehicle of the present: invention is shown generally at 10 for a vehicle 12 for preventing blind spots for viewers, wherein the vehicle 12 has an external lighting system 14, a turn signal system 16, and a brake light system 18.

Figure 2:
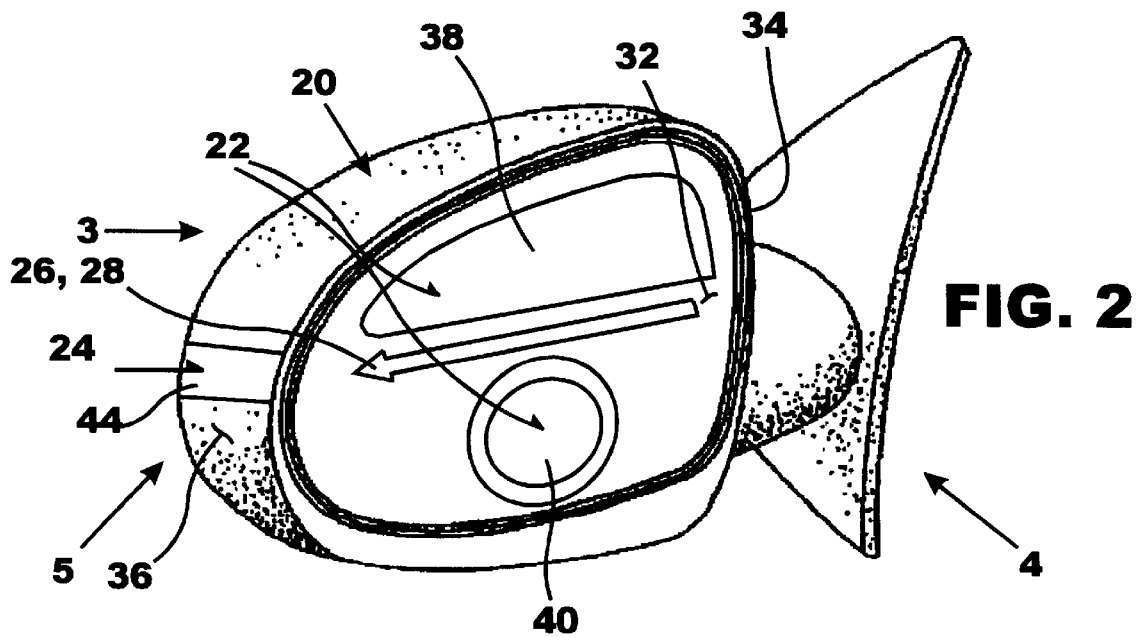
FIG. 2 is an enlarged diagrammatic perspective view of the area generally enclosed by the dotted curve identified by ARROW 2 in FIG. 1 of the present invention.

The configuration of the multi-functional side rear view mirror for a vehicle 10 can best be seen in FIGS. 2–5, which are, respectively, an enlarged diagrammatic perspective view of the area generally enclosed by the dotted curve identified by ARROW 2 in FIG. 1 of the present invention, a diagrammatic front elevational view taken generally in the direction of ARROW 3 in FIG. 2, a diagrammatic rear elevational view taken generally in the direction of ARROW 4 in FIG. 2, and a diagrammatic side elevational view taken generally in the direction of ARROW 5 in FIG. 2, and as such, will be discussed with reference thereto.

The multi-functional side rear view mirror 10 comprises a housing 20 for mounting to the vehicle 12.

The multi-functional side rear view mirror 10 further comprises a pair of mirrors 22 disposed in the housing 20 for viewing behind the vehicle 12.

The multi-functional side rear view mirror 10 further comprises a pair of side marker lights 24 disposed on the housing 20 for continuously illuminating while the external light system 14 of the vehicle 12 is activated for preventing blind spots for the viewers.

The multi-functional side rear view mirror 10 further comprises a turn signal light 26 disposed on the housing 20 for flashing while the turn signal system 16 of the vehicle 12 is activated for preventing blind spots for the viewers.

The multi-functional side rear view mirror 10 further comprises a brake light 28 disposed on the housing 20 for continuously illuminating while the brake light system 18 of the vehicle 12 is activated for preventing blind spots for the viewers.

The housing 20 is aerodynamically shaped for reducing wind resistance and has a front face 30 for facing forwardly, a rear face 32 that is substantially opened for facing rearwardly, an inner side face 34 for facing the vehicle 12, and an outer side face 36 that faces outwardly of the inner side face 34 of the housing 20.

The pair of mirrors 22 are disposed in the rear face 32 of the housing 20 and comprise a flat mirror 38 and a convex mirror 40.

The flat mirror extends 38 in the rear face 32 of the housing 20 and occupies an upper approximate 65% thereof and the convex 40 mirror extends in the rear face 32 of the housing 20 and occupies a lower approximate 35% thereof.

A first side marker light 42 is disposed on the front face 30 of the housing 20 and a second side marker light 44 extends longitudinally along the outer side face 36 of the housing 20.

The first side marker light 42 is amber and the second side marker light 44 is red.

The turn signal light 26 extends laterally across the rear face 32 of the housing 20, between the flat mirror 38 and the convex mirror 40.

The turn signal light 26 comprises two filament bulbs with one filament of each bulb for flashing while the turn signal system 16 of the vehicle 12 is activated.

The turn signal light 26 is arrow-shaped and flashes successively outwardly while the turn signal system 16 of the vehicle 12 is activated.

The brake light 28 is another filament of each bulb of the turn signal light 26 for continuously illuminating while the brake light system 18 of the vehicle 12 is activated.

It will be understood that each of the elements described above, or two or more together, may also find a useful application in other types of constructions differing from the types described above.

While the invention has been illustrated and described as embodied in a multi-functional side rear view mirror for a vehicle, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A multi-functional side rear view mirror for a vehicle for preventing blind spots for viewers, wherein the vehicle has an external lighting system, a turn signal system, and a brake light system, said mirror comprising:
   a) a housing for mounting to the vehicle;
   b) a pair of mirrors disposed in said housing for viewing behind the vehicle;
   c) a pair of side marker lights disposed on said housing for continuously illuminating while the external light system of the vehicle is activated for preventing blind spots for the viewers;
   d) a turn signal light disposed on said housing for flashing while the turn signal system of the vehicle is activated for preventing blind spots for the viewers; and
   e) a brake light disposed on said housing for continuously illuminating while the brake light system of the vehicle is activated for preventing blind spots for the viewers.

2. The multi-functional side rear view mirror as defined in claim 1, wherein said housing is aerodynamically shaped for reducing wind resistance.

3. The multi-functional side rear view mirror as defined in claim 1, wherein said housing has:
   a) a front face for facing forwardly;
   b) a rear face that is substantially opened for facing rearwardly;
   c) an inner side face for facing the vehicle; and
   d) an outer side face that faces outwardly of said inner side face of said housing.

4. The multi-functional side rear view mirror as defined in claim 3, wherein said pair of mirrors are disposed in said rear face of said housing.

5. The multi-functional side rear view mirror as defined in claim 3, wherein said pair of mirrors comprises:
   a) a flat mirror; and
   b) a convex mirror.

6. The multi-functional side rear view mirror as defined in claim 5, wherein said flat mirror extends in said rear face of said housing.

7. The multi-functional side rear view mirror as defined in claim 5, wherein said flat mirror extends in said rear face of said housing and occupies an upper approximate 65% thereof.

8. The multi-functional side rear view mirror as defined in claim 5, wherein said convex mirror extends in said rear face of said housing.

9. The multi-functional side rear view mirror as defined in claim 5, wherein said convex mirror extends in said rear face of said housing and occupies a lower approximate 35% thereof.

10. The multi-functional side rear view mirror as defined in claim 3, wherein a first side marker light is disposed on said front face of said housing and a second side marker light extends longitudinally along said outer side face of said housing.

11. The multi-functional side rear view mirror as defined in claim 10, wherein said first side marker light is amber and said second side marker light is red.

12. The multi-functional side rear view mirror as defined in claim 5, wherein said turn signal light extends laterally across said rear face of said housing, between said flat mirror and said convex mirror.

13. The multi-functional side rear view mirror as defined in claim 1, wherein said turn signal light comprises two filament bulbs, with one filament of each bulb for flashing while the turn signal system of the vehicle is activated.

14. The multi-functional side rear view mirror as defined in claim 1, wherein said turn signal light is arrow-shaped and flashes successively outwardly while the turn signal system of the vehicle is activated.

15. The multi-functional side rear view mirror as defined in claim 13, wherein said brake light is another filament of each bulb of said turn signal light for continuously illuminating while the brake light system of the vehicle is activated.

* * * * *